(12) United States Patent
Persson

(10) Patent No.: US 7,661,640 B2
(45) Date of Patent: Feb. 16, 2010

(54) WALL MOUNT STRUCTURE FOR IMAGE DISPLAY SCREENS

(76) Inventor: Uno John-Sebastian Persson, Sigtunagatan 19, Stockholm (SE) S-113 22

( * ) Notice: Subject to any disclaimer, the term of this patent is extended or adjusted under 35 U.S.C. 154(b) by 182 days.

(21) Appl. No.: 10/593,151

(22) PCT Filed: Mar. 15, 2005

(86) PCT No.: PCT/SE2005/000381

§ 371 (c)(1),
(2), (4) Date: Sep. 18, 2006

(87) PCT Pub. No.: WO2005/088140

PCT Pub. Date: Sep. 22, 2005

(65) Prior Publication Data

US 2007/0194191 A1      Aug. 23, 2007

(30) Foreign Application Priority Data

Mar. 18, 2004   (SE) .................................. 0400732

(51) Int. Cl.
*A47B 96/00*     (2006.01)
*A47K 1/00*      (2006.01)
*A47K 5/00*      (2006.01)
*E04G 5/06*      (2006.01)
*F16L 3/08*      (2006.01)
*F21V 21/00*     (2006.01)
*F21V 35/00*     (2006.01)

(52) U.S. Cl. ............... 248/225.11; 248/489; 248/298.1; 248/223.41; 52/710

(58) Field of Classification Search ................ 248/466, 248/489, 475.1, 298.1, 223.41; 52/710
See application file for complete search history.

(56) References Cited

U.S. PATENT DOCUMENTS

| | | | | | |
|---|---|---|---|---|---|
| 2,767,951 | A | * | 10/1956 | Cousino | ...................... 248/245 |
| 3,686,805 | A | * | 8/1972 | Pofferi | .......................... 52/64 |
| 3,796,405 | A | * | 3/1974 | Rystad | ........................ 248/489 |
| 4,094,415 | A | * | 6/1978 | Larson | ....................... 211/57.1 |
| 4,108,560 | A | * | 8/1978 | Minogue | ...................... 403/33 |

(Continued)

FOREIGN PATENT DOCUMENTS

DE           3304569 C1       7/1984

(Continued)

*Primary Examiner*—J. Allen Shriver, II
*Assistant Examiner*—Michael McDuffie
(74) *Attorney, Agent, or Firm*—Jacobson Holman PLLC

(57) ABSTRACT

A wall mount structure for a "flat" image display screen and includes preferably two from each other spaced supporting profiles attachable against a vertical supporting surface. At the rear side of the display screen, and into existing threaded mounting holes, are interconnecting structures for the profiles attached, which on connection only facilitate movement in the longitudinal direction of the profiles. The profiles advantageously include recesses which facilitate that in direction of insertion leading interconnecting structures can take up connection with the profiles at a point adjacent to the final and mounted position. The profiles are preferably arranged with a stop at the end portion serving as final end portion during an insertion operation of the interconnecting structures, and preferably also attachable stop and/or lock elements at opposed end portions, to be attached when the display screen has been mounted on the wall surface. Supporting profiles can be mounted extending horizontally or vertically.

10 Claims, 7 Drawing Sheets

U.S. PATENT DOCUMENTS

| | | | |
|---|---|---|---|
| 4,212,445 A * | 7/1980 | Hagen | 248/245 |
| 4,602,756 A * | 7/1986 | Chatfield | 248/223.41 |
| 4,869,378 A * | 9/1989 | Miller | 211/94.01 |
| 5,110,080 A * | 5/1992 | Rieman | 248/225.11 |
| 5,154,385 A * | 10/1992 | Lindberg et al. | 248/225.11 |
| 5,201,487 A * | 4/1993 | Epplett | 248/298.1 |
| 5,487,518 A * | 1/1996 | McCraney et al. | 248/225.11 |
| 5,685,516 A * | 11/1997 | Simmons | 248/489 |
| 6,131,866 A * | 10/2000 | Kesinger | 248/225.11 |
| 6,442,805 B2 * | 9/2002 | Pfister | 24/514 |
| 6,484,996 B2 * | 11/2002 | Astell | 248/466 |
| 6,484,997 B1 * | 11/2002 | Edwards et al. | 248/223.41 |
| 7,234,566 B2 * | 6/2007 | Simmons | 187/408 |
| 2002/0067591 A1 | 6/2002 | Tajima | 361/681 |
| 2007/0051861 A1 * | 3/2007 | Teramachi et al. | 248/298.1 |

FOREIGN PATENT DOCUMENTS

EP     1401200 A2     3/2004

* cited by examiner

WALL MOUNT STRUCTURE FOR IMAGE DISPLAY SCREENS

This is a nationalization of PCT/SE2005/000381 filed 15 Mar. 2005 and published in English.

TECHNICAL FIELD

The present invention relates to a wall mount structure for image display screens, e.g. plasma or TFT screens, which are substantially flat.

BACKGROUND ART

Wall mounted image display screens of plasma or TFT type are becoming more and more common, and the size of the screen area is becoming larger and larger. As a result, the screens are also becoming heavier and heavier, and a 42" plasma screen may thus have a weight in excess of 30 kg. Wall mounting is often recognized by the manufacturer as a desirable alternative, and attachment kits for wall mounting are normally supplied, however, often at a fairly high cost. Such an attachment kit comprises normally of a number of co-acting sheet metal parts, which involve a rather complicated mounting procedure.

US 2002/0067591 A1 discloses a housing for a display panel, including a frame body arranged on the circumference of the display panel and having a back cover arranged on the back of the display panel. However, apart from involving a large number of mechanical parts and a frame which must be made to fit the outside measurements of the display panel, use of a surrounding frame prevents two or more display panels from being mounted closely adjacent to each other, and utilized members for attachment to a wall surface will also be visible. Furthermore, the cost of such a frame structure is also fairly high.

DISCLOSURE OF INVENTION

The object of the present invention is to disclose a structure for wall mounting of image display screens, which is considerably simplified in relation to prior art, and which is easily mounted on a wall surface or other vertical support member, and which furthermore is easily adapted to suit different manufacturers designs of display screens. Furthermore, the wall mounted display screen can easily be locked in relation to the wall when mounted, a feature that may be desirable for display screens mounted in public environments, since this type of display screens are rather expensive, and thus especially liable to be stolen.

The wall mount structure for an image display screens according to the present invention comprises of at least one to a wall surface attachable supporting profile with a longitudinally extending outwardly open through groove, and it is mainly characterized in that at the rear side of the display screen existing mounting holes are used for attachment of interconnecting means by means of a screw thread, said interconnecting means, during a sliding movement in the longitudinal direction of said at least one supporting profile, being arranged to take up an interconnected condition with said at least one supporting profile.

A stop means is preferably arranged at the end portion of supporting profile(s) whereagainst the interconnecting means to be connected to the profile are slided during a mounting operation. A second stop means is advantageously arranged attachable at the end portion of the supporting profile which is opposed to the location of the first stop means. The attachable second stop means can be of a lockable type.

As supporting elements attachable to a supporting vertical structure are preferably two supporting profiles arranged extending substantially horizontal at a wall surface in a spaced relationship to each other corresponding to the height relationship for existing mounting holes at the rear side of the display screen. Alternatively, the supporting profiles may also be arranged extending substantially vertical at the wall surface in a spaced relationship to each other corresponding to the sideway relationship for existing mounting holes at the rear side of the display screen. Furthermore, the supporting profiles are advantageously arranged having a recess facilitating that in the insertion direction for the interconnecting means leading interconnecting means receive engagement with the supporting profiles at a position more adjacent to the stop means than opposed end portion.

BRIEF DESCRIPTION OF DRAWINGS

A number of embodiments according to the present invention, only intended to serve as non-restricting examples of embodiments within the scope of the invention, will be more fully described below with reference to the accompanying drawings, in which.

MODES FOR CARRYING OUT THE INVENTION

Figure 1:
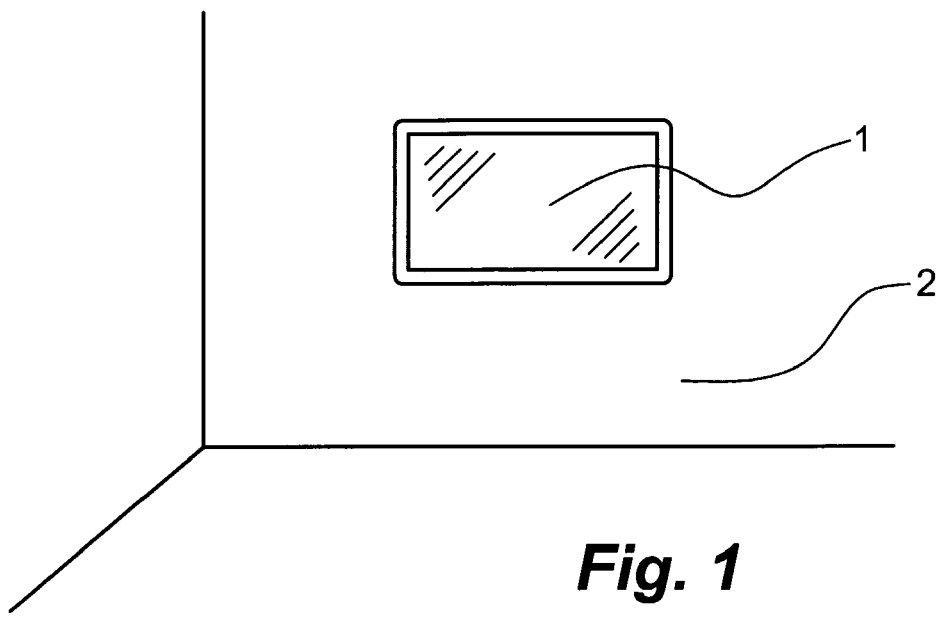
FIG. 1 is a view of a wall surface and a thereto mounted image display screen, only intended to disclose the type of use facilitated with a wall mount structure according to the present invention.

With reference to FIG. 1, an example is shown of a so called "flat" display screen or monitor 1, e.g. of plasma or TFT type, mounted on a wall surface 2. It should be mentioned, that the term wall surface is intended to cover any supporting vertical structure.

Figure 2:
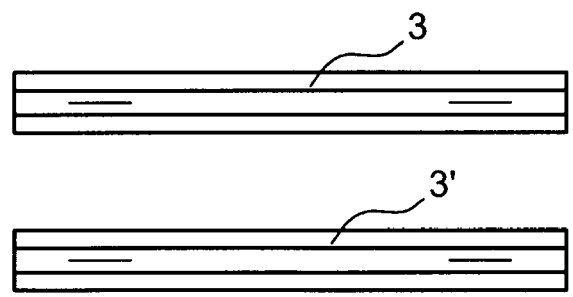
FIG. 2 is a view of the wall surface, prepared according to a first embodiment of the invention by attachment of two supporting profiles for mounting of an image display screen.

FIG. 2 shows an example of how the wall surface 2 can be prepared for attachment of a display screen 1, and in this embodiment are two supporting profiles, as complete units denominated 3, 3', attached to the wall surface 2. In this embodiment, the two supporting profiles 3, 3' are arranged extending horizontally and having a substantially parallel relationship in relation to each other.

Figure 3:
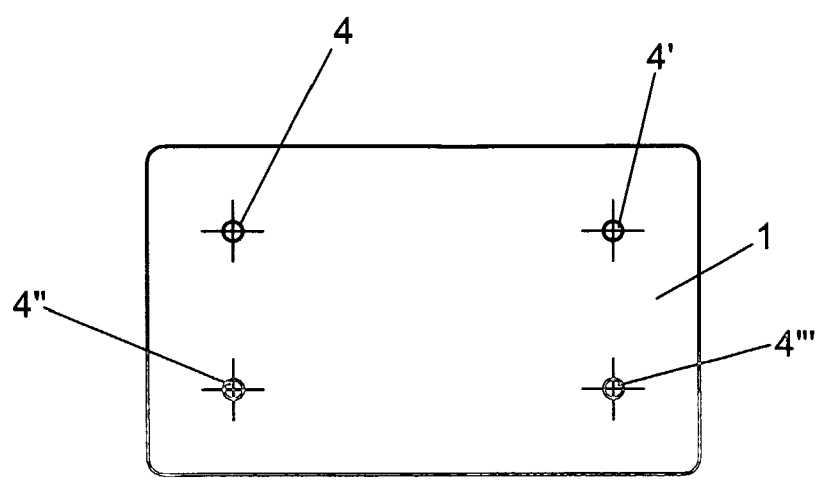
FIG. 3 discloses schematically the rear side of an image display screen facing the wall surface.

At the rear surface of a display screen 1, i.e. the surface facing the wall surface 2 when mounted, exist normally at least four threaded mounting holes 4, 4', 4'', 4''', intended to be used to facilitate attachment of the display screen to a table support, a floor support, or parts of a mounting kit intended for wall mounting. An example of the configuration for such holes 4, 4', 4'', 4''' is shown in FIG. 3.

According to the present invention, the above mentioned mounting holes 4, 4', 4'', 4''' are used for attachment means coacting and interconnecting with the supporting profiles 3, 3', said means denominated 5 as a single complete unit. An example of an embodiment of such an interconnecting means 5 is shown in FIG. 4 connected to a supporting profile 3, which is shown in cross-section and attached against a wall surface 2, and a portion of the display screen is also shown in point-dash lines.

Figure 4:
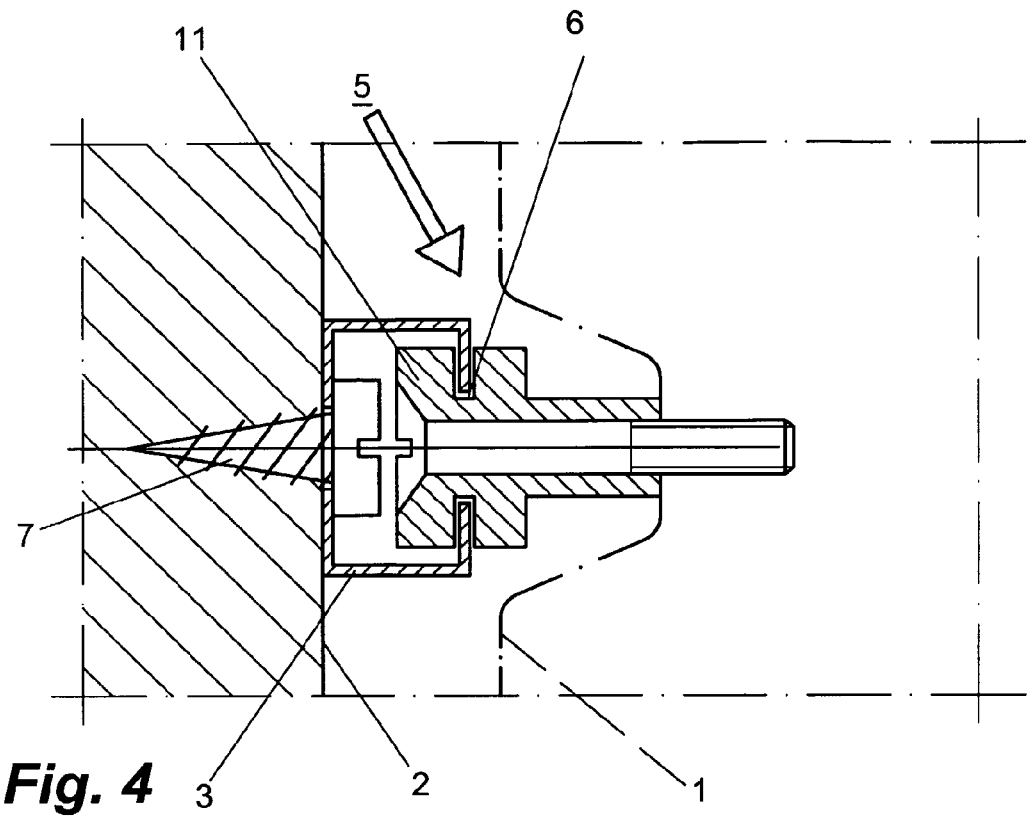
FIG. 4 is a cross-sectional view of one of the supporting profiles shown in FIG. 2 with a supported display screen.

In the embodiment shown in FIG. 4, the supporting profile 3 can also be described as a U-shaped profile, having the end portions of the free legs bent over in direction towards each other, thus defining a groove 6 extending in the longitudinal direction of the profile 3, open in direction from the wall surface 2. Said groove 6 is arranged having a width larger than the diameter of the screw heads of the screws 7 utilized for attachment of the supporting profile 3 against the wall surface 2.

Figure 5:
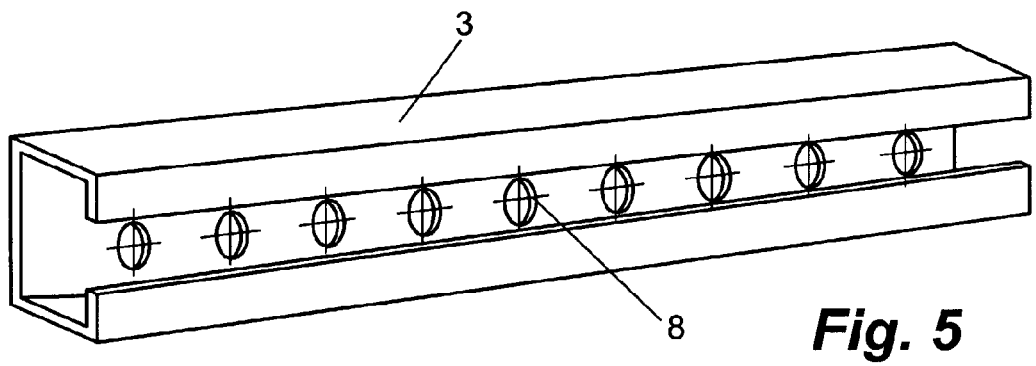
FIG. 5 is a view of an example of a supporting profile and of the side facing away from a wall surface.
Figure 6:
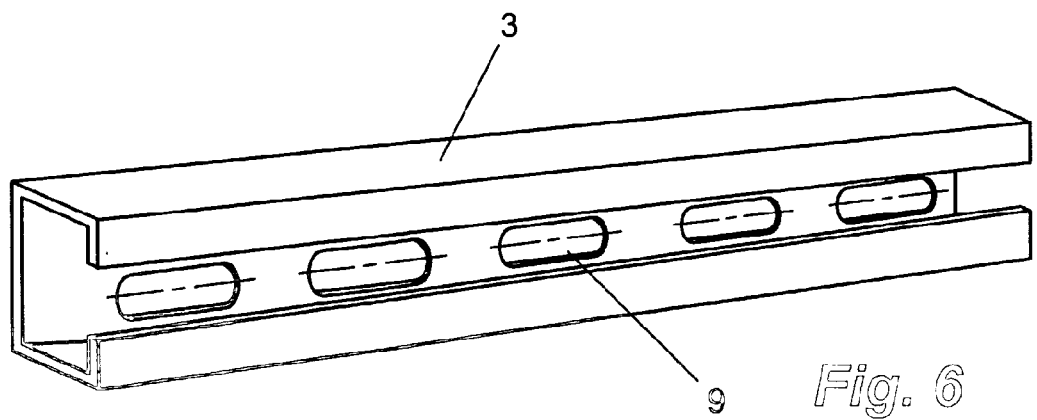
FIG. 6 is a view corresponding to FIG. 5 of a slightly modified supporting profile.

FIG. 5 shows the supporting profile 3 with a number of centrally located cylindrical through holes 8 for the screws 7. As shown, these holes 8 may advantageously consist of a series of holes, spaced from each other by a small predetermined distance. This facilitates, when mounting, possibility to choose those holes which e.g. correspond to existing cross bars in the wall element whereto attachment should take place. Furthermore, a larger or smaller number of holes 8 with associated screws 7 can be used, which facilitates adaption to the structural properties of relevant wall, as well as to the weight of the display screen 1 to be supported. As shown in FIG. 6, and as an alternative to the cylindrical holes 8, a number of from each other spaced grooves 9 may also be used, extending in longitudinal direction of the supporting profile 3. This facilitates a further improved possibility to locate the screws 7 used for attachment of the profile 3 in positions adapted to existing cross bars which exist in certain types of wall elements. The profile 3 shown in FIGS. 5 and 6 includes also a recess 10, which will be further described later with regard to design and function.

Figure 7:
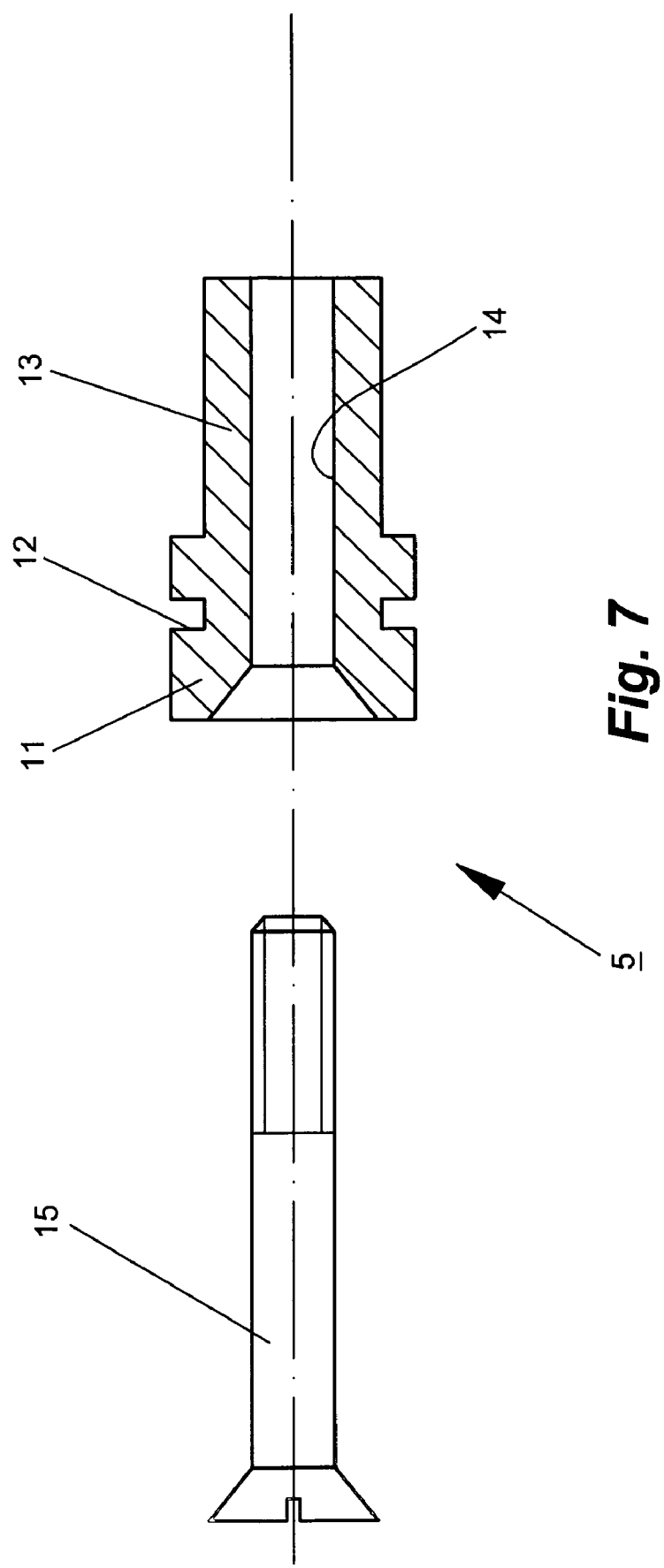
FIG. 7 is a view of the parts included in one of the attachment means which coact with utilized supporting profiles.

As shown in FIG. 7, the interconnecting means 5 in the shown example of an embodiment comprises of a first cylindrical part 11, having a diameter exceeding the width of the groove 6, and with a surrounding groove 12, into which the free and towards each other directed parts of the profile 3 (which define the groove 6) are received. The surrounding groove 12 is located in such a way, that the end surface of the first part 11, which is surrounded by the profile 3, receives such a location, that a sliding movement in longitudinal direction of the groove 6 is not prevented by the screw heads of the aforementioned screws 7. The first part 11 is advantageously in direction from the profile 3 transformed into a second part 13, having a smaller diameter, in order to reduce the contact surface against the rear surface of the display screen 1. Said second part 13 may consist of a member integrated with the first part 11, but may also consist of an individual part. Finally, said first part 11 and second part 13 also include a centrally located through hole 14, which is used for attachment by means of a screw 15 to existing threaded hole 4 in the rear surface of the display screen 1.

The mounting operation of a display screen 1 against a wall surface 2 with use of the above described components, and with two supporting profiles 3, 3' arranged as shown in FIG. 2, will now be described in detail.

Initially are the two supporting profiles 3, 3' mounted with use of a suitable number of screws against a wall surface 2 in a substantially parallel relationship, and having a horizontal extension. The distance between the central portions of the profiles 3, 3' is chosen to correspond to the distance in height for the threaded holes 4, 4', 4'', 4''' at the rear side of the display screen 1. In said threaded holes 4, 4', 4'', 4''' are attached interconnecting means 5 of the type which have been described more in detail with reference to FIG. 7.

Figure 8:
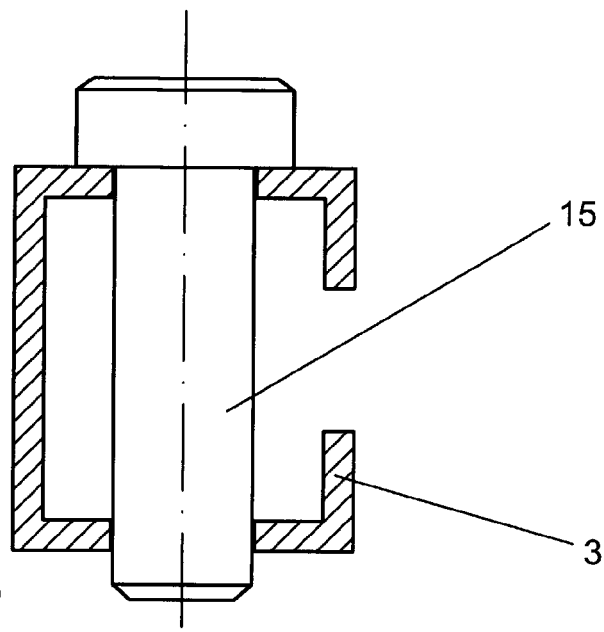
FIG. 8 is a view of an example of an end stop member.

The supporting profiles 3, 3' are at one end portion arranged with a stop means 15, which, e.g. with reference to FIG. 2, may be arranged at the left and final part of the profiles 3, 3' (not shown in said figure). An example of such a stop means 15 is shown in FIG. 8, and comprises in this case of a pin having a head, extending in vertical direction through holes taken up in the profiles 3, 3'. The stop means 15 can obviously be accomplished in numerous ways, i.e. as a screw, a pin, a member integrated with each profile 3, 3', or any other desirable way. It is only important that the stop means prevents bypassing movement for the means 5 interconnected to the profiles 3, 3'.

Figure 9A:
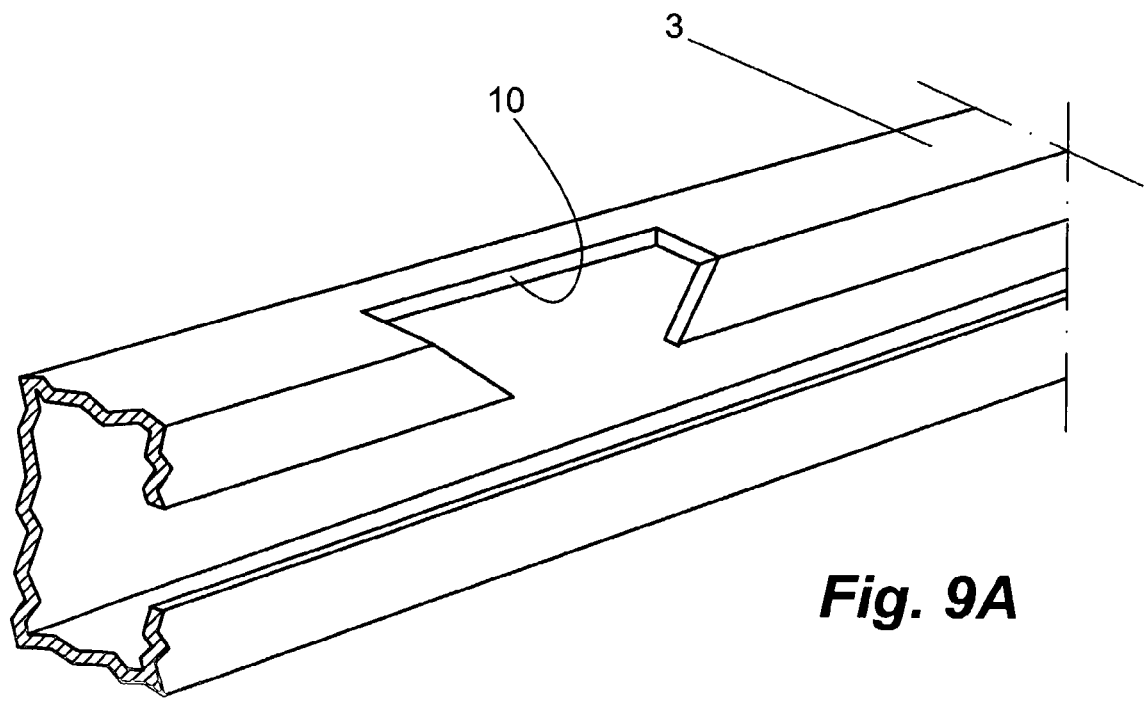
FIGS. 9A and 9B are views intended to illustrate an example of means facilitating a shortened linear sliding movement when mounting the display screen on a wall surface.
Figure 9B:
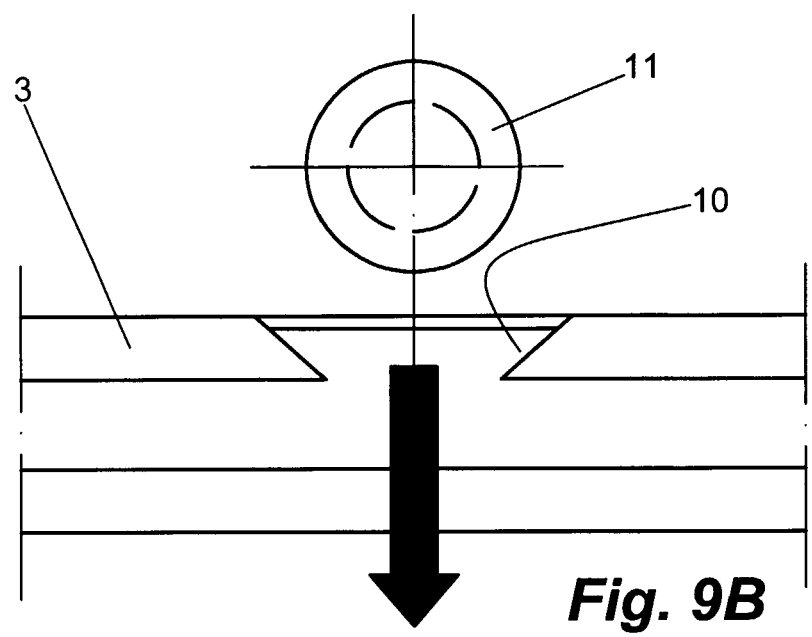

An example of previously mentioned recess 10 is shown in FIG. 9A. According to this example, the recess 10 facilitates that an interconnecting means 5 can be moved down to a position supported by present profile 3, and this is illustrated schematically in FIG. 9B, in which related members location in relation to each other are shown prior to joining, and with the direction of movement for a joining operation illustrated by means of an arrow.

In this example of an embodiment, the display screen 1, which is to be mounted on the wall surface 2, is (in this case) located with the leftmost interconnecting means 5 above the recesses 10, the display screen 1 is slightly lowered whereby the grooves 6 by their sides surround the upwardly directed part of each profile 3, 3', whereafter the display screen 1 is slided in direction towards the stop means 15 of the profiles 3, 3'. During this sliding movement also the other two interconnecting means 5 will be received by the profiles 3, 3', and with the grooves 6 surrounding towards each other directed parts of the profiles 3, 3'.

When the interconnecting means 5 inserted through the recesses 10 have been slided into contact with related stop means 15, the display screen 1 will be supported by the supporting profiles 3, 3' attached to the wall surface 2. The display screen 1 is now preferably locked in the position taken up, e.g. by previously described alternatives for stop means 15. Provided that the stop means 15 is of a more permanent type, one may also use pad locks, wire locks or similar as lock means at the end portions of the profiles 3, 3' which are opposed to the stop means 15, which results in that the display screen is locked in mounted position, a feature of particular value when display screens 1 are mounted in public environments.

Figure 10:
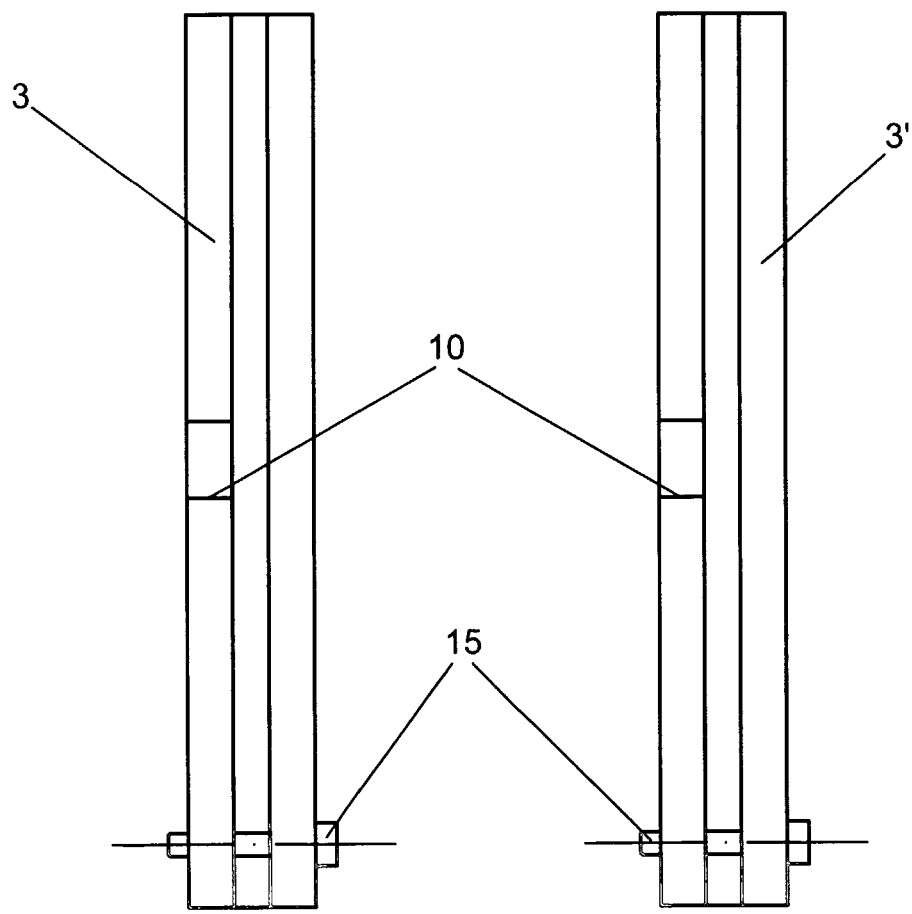
FIG. 10 illustrates how the supporting profiles can be arranged having a vertical direction of extension.

Described example of an embodiment can be modified in a number of ways, and as a second example can the possibility to arrange the supporting profiles 3, 3' extending vertically be mentioned. An example of such a modification is shown in FIG. 10, wherein the lowermost portions of the profiles 3, 3' are arranged with stop means 15. In this embodiment, the lowermost interconnecting means 5 are initially inserted at the recesses 10 by means of a sideway movement in relation to the profiles 3, 3', whereafter the display screen 1 is lowered, whereby on one hand the interconnecting means 5 inserted through the recesses 10 are moved downwardly into contact with the stop means 15, and on the other hand also the upper interconnecting means 5 are brought into engagement with the profiles 3, 3' by insertion at the upper and open end portions of the profiles 3, 3'. To accomplish a locking operation at said upper end portions will not be a primarily important action, since the weight of the display screen 1 will ensure that same remains in intended position. However, locking may often be a desirable action, e.g. as a preventive measure against theft, and this can for example be accomplished in the fashion described with reference to the first embodiment.

It should also be noted, that described embodiments obviously can be arranged without the described recess 10, i.e. by insertion of all interconnecting means 5 from the end portions of the profiles 3, 3' which are opposed to the stop means 15. A disadvantage would be that a relatively long sliding movement must be performed before contact is established with related stop means 15.

Figure 11:
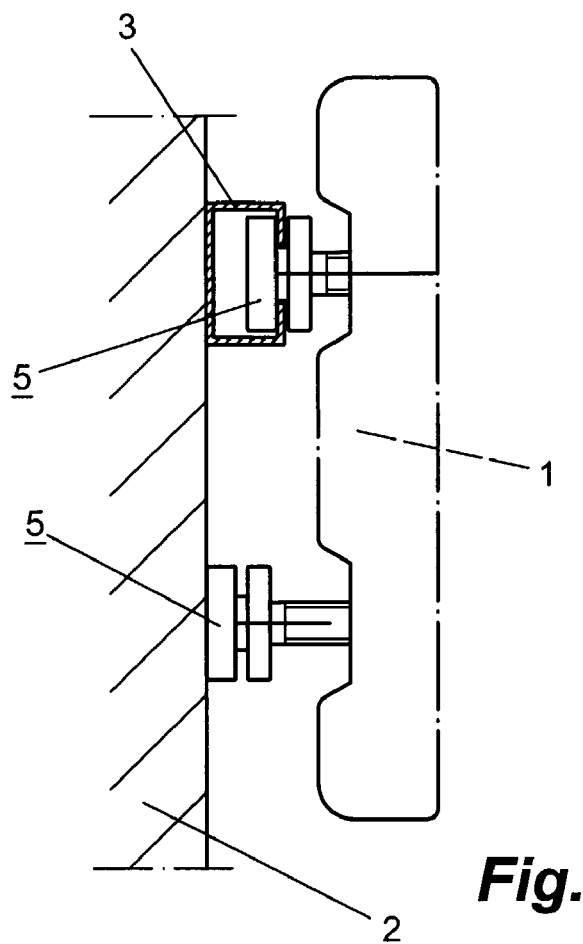
FIG. 11 shows an example of mounting with use of only one horizontal supporting profile.

For some applications, the first embodiment can be modified by non-use of the lower horizontal supporting profile 3'. Such a solution would obviously necessitate that the supporting wall, as well as supporting profile 3, has required tensile properties to support the display screen 1. In such an embodiment, the lower interconnecting means 5 may also be mounted on the display screen, in order to serve as support against the wall surface 2, and to facilitate that the screen surface of the display screen receives a substantially parallel extension to the wall surface 2. Such a modification is schematically illustrated in FIG. 11.

With regard to embodiments including two supporting profiles 3, 3', the cross-sectional configuration of the profiles 3. 3' may also differ from what has been described earlier. An example of such an alternative arrangement is shown in FIG. 12A, and a mirror-inverted arrangement of same is shown in FIG. 12B.

Figure 13:
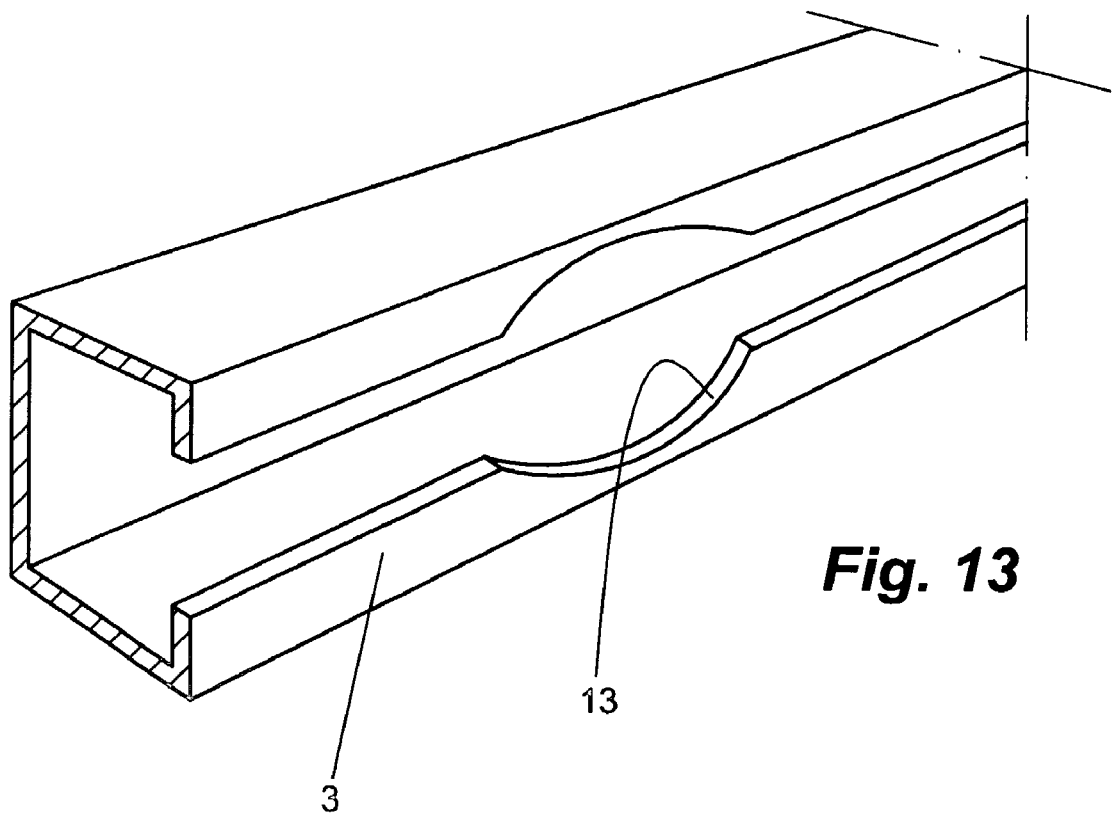
FIG. 13 shows an example of an alternative design for a recess in a supporting profile.

Previously mentioned recess 10 can also be accomplished in a number of ways, and FIG. 13 relates to an arrangement in which related interconnecting means 5 can be inserted into a position in engagement with the supporting profiles 3, 3' by means of an insertion movement directed towards the wall surface 2.

Figure 12A:
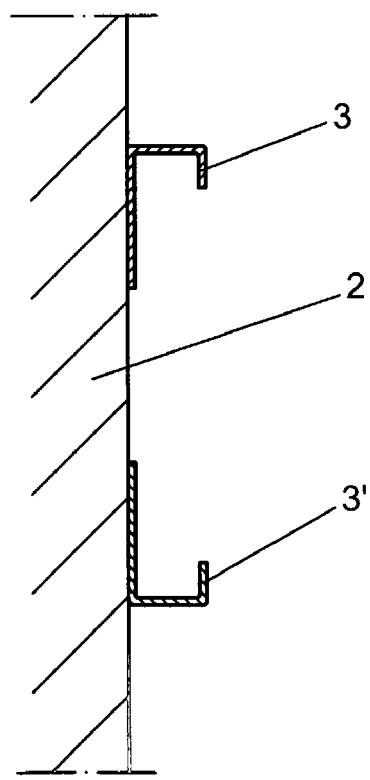
FIGS. 12A and 12B show an example of an alternative type of supporting profile, and also show two in relation to each other different ways of mounting same to a wall surface.
Figure 12B:
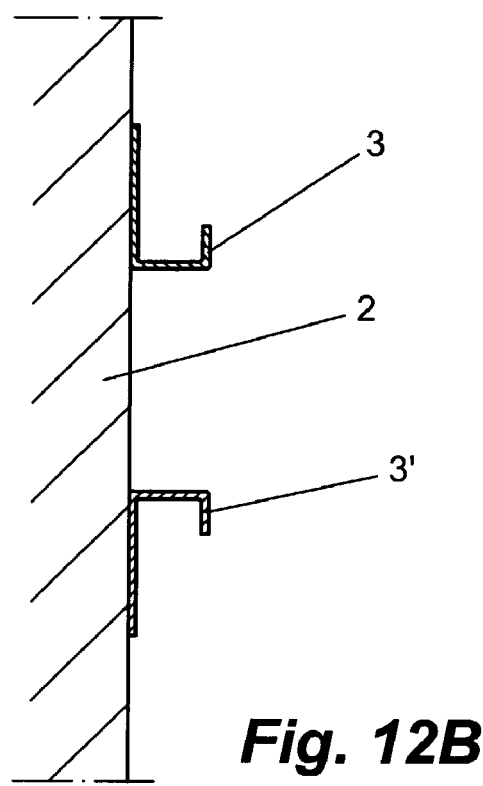

The interconnecting means 5 for engagement with the profiles 3, 3' may also be modified in a number of ways, and may, e.g. comprise of a square or rectangular part with two in relation to each other opposed grooves (for use in connection with profiles having two towards each other directed parts defining the groove 6) or having only one groove at one side (when used in connection with profiles of the type shown in FIGS. 12A and 12). In these cases, it is normally advantageous that the part used for contact with the rear surface of the display screen 1, previously denominated the second part 13, is arranged as an individual and cylindrical member. This will facilitate that the extension of the latter is adapted by its length to the location of the rear part of the display screen 1 whereagainst abutment is accomplished, i.e. second parts 13 having different lengths can be supplied, and a user can choose parts 13 having required length.

The examples of embodiments according to the present invention which have been shown and described can thus be modified in a number of different ways, while maintaining the important features of the inventive thought, and within the scope of the enclosed claims.

INDUSTRIAL APPLICABILITY

The wall mount structure according to the present invention facilitates easy and rapid attachment of an image display screen to a vertically extending supporting surface. It comprises of a minimum of individual parts, and can be manufactured at a low cost. A minimum of different sizes will cover a large number of differently sized display screens. The wall mount structure can also serve as an anti-theft device, i.e. by facilitating locking in mounted position. Furthermore, the wall mount structure remains hidden behind the display screen, and same also facilitates that a number of display screens are mounted in a close side-by-side relationship.

The invention claimed is:

1. A wall mount structure for an image display screen, said wall mount structure comprising
at least one wall surface attachable supporting profile with a longitudinally extending outwardly open through groove, at a rear side of the display screen existing mounting holes being used for attachment of interconnecting means by a screw having a head and a thread, said interconnecting means, during a sliding movement in a longitudinal direction of said at least one supporting profile, being arranged to take up an interconnected condition with said at least one supporting profile,
said interconnecting means including a first cylindrical part having a diameter exceeding a width of said through groove, and with an at least partly surrounding groove arranged to grip at least one vertically extending part that is in one piece with the at least one supporting profile,
said first cylindrical part having a through hole, said screw passing through said through hole with said thread of said screw attachable at mounting holes at the rear side of the display screen and said head of said screw being seated in said first cylindrical part.

2. The wall mount structure according to claim 1, wherein a first stop means is arranged at an end portion of the supporting profile whereagainst the interconnecting means to be connected to the profile is slid during a mounting operation.

3. The wall mount structure according to claim 2, wherein a second stop means is arranged attachable at the end portion of the supporting profile which is opposed to a location of the first stop means.

4. The wall mount structure according to claim 3, wherein the second stop means is of a lockable type.

5. The wall mount structure according to claim 1, wherein two of the supporting profiles are arranged extending substantially horizontal at the wall surface in a spaced relationship to each other corresponding to a height relationship for existing mounting holes at the rear side of the display screen.

6. The wall mount structure according to claim 1, wherein two of the supporting profiles are arranged extending substantially vertical at the wall surface in a spaced relationship to each other corresponding to a sideways relationship for existing mounting holes at the rear side of the display screen.

7. The wall mount structure according to claim 5, wherein the supporting profiles are arranged having a recess facilitating that in an insertion direction for the interconnecting means leading interconnecting means receive engagement with the supporting profiles at a position more adjacent to stop means than opposed end portions of the profiles.

8. The wall mount structure according to claim 1, wherein a surrounding groove is arranged to define a distance to heads of screws whereby the profiles are attachable against the wall surface.

9. The wall mount structure according to claim 1, wherein the interconnecting means includes, a second part extending from the first part in a direction towards the display screen.

10. The wall mount structure according to claim 1, wherein the profiles have a substantially U-shaped configuration with free end portions bent over in a direction towards each other, thereby defining an outwardly open groove between the free end portions.

* * * * *